Oct. 23, 1928.
E. D. EBY
1,688,693
INSULATED CABLE JOINT
Filed April 30, 1924
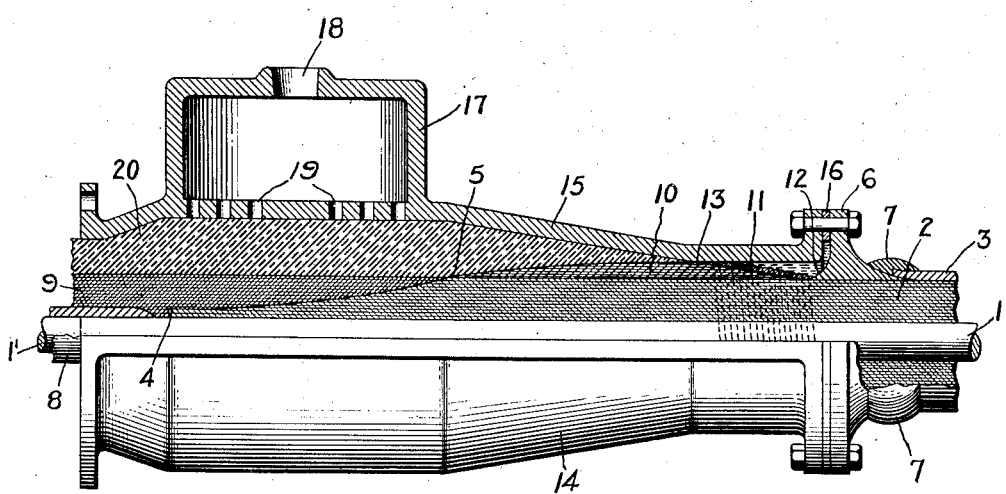
Inventor:
Eugene D. Eby;
by
His Attorney.

Patented Oct. 23, 1928.

1,688,693

UNITED STATES PATENT OFFICE.

EUGENE D. EBY, OF PITTSFIELD, MASSACHUSETTS, ASSIGNOR TO GENERAL ELECTRIC COMPANY, A CORPORATION OF NEW YORK.

INSULATED CABLE JOINT.

Application filed April 30, 1924. Serial No. 710,183.

The present invention relates to the distribution of electrical power and more especially to insulated cables enclosed in metal sheaths for installation underground and similar places.

Underground power cables, as generally made, consists of a copper conductor wire or cable insulated by many wrappings of cambric or paper tape coated or saturated with fluid or semifluid insulating material such as petrolatum and an outside water-tight protective sheath usually consisting of a lead pipe formed in place thereon.

For practical considerations of transportation and installation in the usual conduits, underground power cable is made in relatively short lengths, usually from three hundred to six hundred feet, which after being drawn into the conduit, are joined together end to end at the manholes.

Although substantially the same reasons obtain from both economic and operating standpoints for transmitting electrical power at high potentials in the case of underground circuits, as in the case of overhead circuits, nevertheless the potentials of the former case have continued at mere fractions of the potentials of the latter.

It has been generally recognized that one of the weak points and consequently one of the features limiting the operating potentials on an underground power cable, was the insulated joint uniting two cable sections.

The object of my invention is the provision of an improved insulated joint or terminal connection for electric insulated sheathed cables for higher operating potential, which shall be capable of sustaining as great electrical stress as the cable in series therewith, and which shall be adapted for installation with facility and with an efficient use of material and reasonable cost.

One embodiment of the invention is shown in the accompanying drawing which is a part side elevation and part longitudinal section of the right-hand half of my insulated joint. The left-hand half, being a counterpart of that shown, is omitted for the sake of clearness of illustration.

The electric conductors 1 and 1' which may be either solid or stranded copper wires are surrounded by smooth machine-wound tape wrappings 2 of cambric or paper impregnated with petrolatum, great care being taken in the manufacture thereof to exclude all foreign matter and avoid the formation of voids or air pockets in the insulating material, and a lead pipe sheath 3 formed in place thereon to prevent escape of the liquid or semiliquid insulating material and to prevent the entrance thereto of air and moisture.

In order to join two cable sections or to make a terminal connection at the end of the cable line in accordance with my invention, the lead sheath is cut away for a foot or more from the ends of adjacent cable sections and the insulating wrappings 2 cut away to expose a short length of the conductors 1 and 1'. The insulating wrappings 2 are cut away from point 4 to point 5 along a line of such shape that when the joint has been completed the distribution of potential along the surface 4 to 5 shall be approximately uniform.

A metal casing ring 6 having a central bore of a size closely to fit the outer periphery of the wrapped insulation 2 is passed over each cable end and connected as by a wiped joint 7 to the end of the lead pipe sheath 3.

A splicing sleeve 8 is soldered over the joint between the adjacent ends of the conductors 1 and 1' and insulating wrappings 9, similar to the wrappings 2, are carefully hand-wound over the sleeve 8 and completely, or as completely as possible, filling the space between the conical ends of the original wrappings 2.

Reenforcing wrappings 10 are wound upon the cylindrical surface of the original wrappings 2 from the inner side of the casing ring 12 to the point 5 where the scarfing of the original wrappings 2 begins. These reenforcing wrappings 10 are built up to a maximum thickness at a point 13 so determined that the electrical stress in the filling oil or compound 20 at points adjacent to 13 shall not exceed a safe value. Electrical stress on the filling oil or compound between 12 and 13 is prevented by overlaying the tapered surface from 12 to 13 with a metal ground sleeve 11, electrically connected as by soldering to the inner edge 12 of the casing ring 6.

The outer surface of the reenforcing wrappings 10 between points 5 and 13 is so determined that the potential distribution along the surface 5 to 13 is approximately uniform.

The ground shield 11 is shown in the form of a copper wire coiled tightly upon the conical end of the wrappings 10 to the vicinity of the greatest thickness thereof at the point 13.

The main portion of the outer casing of the joint comprises longitudinally split sleeve sections 14 and 15 provided with flanges adapted to be bolted together to hold the sections about the insulated cable joint and at their opposite ends to the casing rings 6 with interposed waterproof packing 16.

The upper casing sections 15 have formed therein reservoir chambers 17 with a large filling opening 18 at top and a plurality of distributed small holes 19 through the bottom whereby a supply of liquid or semiliquid insulation 20 may be maintained in all spaces within the casing not otherwise occupied and to care for expansion and contraction of the material contained therein to thereby prevent the formation of voids.

It has been observed that insulated cable joints, as heretofore made, have owed their weakness largely to the fact that concentration of electric stresses took place in the insulation of the cable and in the insulating filling compound of the joint in the vicinity of the end of the lead sheath or the electrical end thereof, the inner flange 12 of the casing ring 6, since at this point in the joint of the usual construction there occurs a change from the homogeneous insulation of the cable itself to a combination of the cable insulation and the joint filling compound having different dielectric characteristics. By the addition of the reenforcing wrappings 10, overlaid on one of the tapered surfaces with the ground shield 11, the filling insulation 20, at the point 13, is removed to such a distance from the conductor 1, that the radial stress therein is reduced to a safe value, and by proper shaping of the surfaces of discontinuity from 4 to 5 and from 5 to 13 in their relation to the conductor 1 and casing 15, I am enabled to distribute the difference of potential along these surfaces between 1 and 13 in an approximately uniform manner, thus securing a high efficiency of the insulation along these surfaces. It is apparent that in the arrangement above described, I remove the point of maximum radial electrostatic stress in the filling compound 20, to a safe distance from the conductor, and also distribute the longitudinal electrostatic stress between the conductor 1 and the grounded shield 11 in such a manner as to subject the surfaces of discontinuity to safe differences of potential.

While I have restricted the above description and drawing to an insulated joint between the ends of two cable sections it will be readily understood that the construction described contains features which may be used at the ends of the completed cable where they join the terminal connectors.

What I claim as new and desire to secure by Letters Patent of the United States, is:—

1. An insulated joint for electric cables having thereon wrappings of sheet insulation and a protective metal sheath, comprising an outer casing, an end ring for said casing adapted to fit upon the surface of said cable insulation and electrically connected to said sheath, reenforcement wrappings of sheet insulation disposed upon said cable insulation with a tapered end adjacent said end ring, and a ground shield electrically connected to said end ring and disposed upon the tapered end of said reenforcement wrapping.

2. An insulated joint for electric cables having a central conductor incased in insulation and a protective metal sheath, a metal ring fitting the outside of the conductor insulation and extending at one end beneath the end of said sheath and electrically united thereto, reinforcement insulation about the conductor insulation with a tapered end adjacent said ring, and a ground shield electrically connected to said ring and disposed upon the tapered end of said reenforcement insulation.

In witness whereof, I have hereunto set my hand this 25th day of April, 1924.

EUGENE D. EBY.